UNITED STATES PATENT OFFICE.

ZACHRIAH TAYLOR CLARK, OF PORTLAND, OREGON.

COMPOSITION FOR HARDENING STEEL AND SIMILAR METALS.

1,253,786.     Specification of Letters Patent.     Patented Jan. 15, 1918.

No Drawing.     Application filed January 17, 1917. Serial No. 142,904.

*To all whom it may concern:*

Be it known that I, ZACHRIAH TAYLOR CLARK, a citizen of the United States, and a resident of Portland, in the county of Multnomah and State of Oregon, have invented a new and Improved Composition for Hardening Steel and Similar Metals, of which the following is a full, clear, and exact description.

My invention relates to a composition in liquid form for tempering and toughening steel, iron, and similar metals. The mixture utilized for the hardening results from the intermixing of the following ingredients in substantially the following proportions: Linseed oil, 4.75 gallons; copper sulfate, six ounces; common salt, five pounds; unslaked lime, two pounds; zinc, two ounces; oxid of iron, four ounces. The solid ingredients are thoroughly mixed.

The metal to be tempered is heated to the desired temperature and then immersed, while in the hot state, in the solution for a few seconds, the mixture acting almost instantaneously on the metal in such a manner as to temper and toughen without checking or warping the metal, thereby affording a uniform temper of the desired degree without trouble or mistake of the operator.

I claim:

A composition for tempering steel and similar metals, which results from the mixing of the following ingredients,—copper sulfate, common salt, unslaked lime, zinc, oxid of iron, in proportions substantially as specified, added to linseed oil, also in proportions as specified.

ZACHRIAH TAYLOR CLARK.